United States Patent Office 3,786,038
Patented Jan. 15, 1974

3,786,038
PEPTIDE BOND FORMATION IN THE PRESENCE OF TRIARYL PHOSPHITES AND HETEROCYCLIC DISULFIDES
Teruaki Mukaiyama and Masaaki Ueki, Tokyo, and Manabu Suzuki, Hiratsuka, Japan, assignors to Sankyo Company Limited
No Drawing. Filed Oct. 4, 1971, Ser. No. 186,434
Claims priority, application Japan, June 29, 1971, 46/47,415
Int. Cl. C07c 103/52; C07g 7/00; C08h 1/00
U.S. Cl. 260—112.5                5 Claims

ABSTRACT OF THE DISCLOSURE

Improved and commercially advantageous process for the preparation of a peptide which comprises reacting a carboxyl component which is an amino acid or peptide having free carboxyl group and other protected reactive functional groups with an amino component which is an amino acid or peptide having free amino group and other protected reactive functional groups in the presence of a triaryl phosphite and a disulfide of a mercaptoheterocyclic compound containing a nitrogen-carbon double bond with which the disulfide linkage is conjugated.

---

This invention relates to improvements in the preparation of peptides.

More particularly, this invention is concerned with an improved and novel process for the preparation of a peptide which comprises reacting a carboxyl component with an amino component in the presence of a triaryl phosphite and a disulfide of a mercaptoheterocyclic compound containing a nitrogen-carbon double bond with which the disulfide linkage is conjugated.

The term "carboxyl component" as used herein is intended to mean an amino acid or peptide in which other reactive functional groups capable of affecting the present reaction than the carboxyl group required for the present reaction are protected with protective groups commonly employed in a peptide synthesis. Also, the term "amino component" as used herein is intended to mean an amino acid or peptide in which other reactive functional groups capable of affecting the present reaction than the amino group required for the present reaction are protected with protective groups commonly employed in a peptide synthesis.

Heretofore, we have made numerous attempts to find out new processes for the preparation of carboxylic acid amides, especially those for the preparation of carboxylic acid amides, for example, peptides without any racemization as a side reaction. As a result of our previous studies, it has been found that a carboxylic acid amide can be prepared by reacting a carboxylic acid with an organic amine or a sulfenic acid amide thereof in the presence of a tertiary phosphine and a disulfide of a mercaptoheterocyclic compound containing a nitrogen-carbon double bond with which the disulfide linkage is conjugated, which has been disclosed and claimed in our copending U.S. patent application No. 90,419, filed Nov. 17, 1970.

However, this prior process has a problem to be improved in that the tertiary phosphine, which is considerably expensive, should be employed as a reagent.

Then, as a result of our further studies to develop an inexpensive reagent suitable for the above-depicted carboxylic acid amide, e.g., peptides preparation, it has now been found that the above problem can be advantageously settled by employing a triaryl phosphite instead of the tertiary phosphine and reacting the carboxyl component with the amino component in the presence of such newly developed reagent, i.e., the triaryl phosphite, and the disulfide.

It is, accordingly, a primary object of this invention to provide an improved and commercially advantageous process for the preparation of a peptide by the use of an inexpensive triaryl phosphite reagent.

Other objects and advantages of this invention will be apparent to those skilled in the art from the following description.

In carrying out the process of this invention, the reaction may be suitably effected by intimately contacting of the above-mentioned four reactants, i.e., the amino component, the carboxyl component, the disulfide and the phosphite in a suitable solvent. The order of addition of four reactants is not critical feature, but it is usual to have four reactants incorporated into a reaction system all at once or to have dissolved other three reactants than the phosphite and subsequently add the latter to the resulting solution.

The carboxyl and amino components which may be utilized as starting materials in the process of this invention may be any of those amino acids and peptides commonly employed in a peptide synthesis [For example, see "Chemistry of Proteins," vol. 1 (1969), ed. by S. Akabori, T. Kaneko & K. Narita, Kyoritsu Shuppan Co. Ltd. Japan]. As explained hereinabove, the amino and carboxyl components to be employed in this invention are those specifically protected amino acids or peptides.

Representative of protectings of other reactive functional groups as set forth above are protecting of amino group with such protective groups as a substituted or unsubstituted benzoyloxycarbonyl group, a tert. alkoxycarbonyl group, formyl group, trifluoroacetyl group, an arylsulfonyl group, a triarylmethyl group, a substituted thiocarbonyl group, o-nitrophenoxyacetyl group, a trialkylsilyl group, an arylidene group, acetoacetyl group and the like; protecting of carboxyl group with such protective groups as an alkyl ester group, a substituted or unsubstituted benzyl ester group, phthalimidomethyl ester group, benzhydryl ester group, a substituted hydrazino group and the like; protecting of guanidyl group with such protective groups as benzyloxycarbonyl group, nitro group and the like; and protecting of the nitrogen atom in imidazole moiety and sulfhydryl group with such protective groups as benzyloxycarbonyl group, benzyl group and the like, but other protective groups, if utilizable for a peptide synthesis, may be favorably employed in the process of this invention.

The triaryl phosphites which may be employed in the process of this invention are those in which the aryl group is a phenyl or naphthyl group which may be substituted with a halogen atom, e.g., chlorine, bromine, fluorine and iodine, an alkyl group, advantageously, of 1 to 4 carbon atoms, e.g., methyl, ethyl, propyl and butyl, and an alkoxy group, advantageously, of 1 to 4 carbon atoms, e.g., methoxy, ethoxy, propoxy and butoxy.

In view of commercial availability, preferred examples of the triaryl phosphites include symmetric triphenyl phosphites in which the phenyl group may be substituted with any of the above-depicted substituents, representative of which are triphenyl phosphite, tris(chlorophenyl)-phosphites, tris(methoxyphenyl)phosphites, tritolylphosphites and the like.

The disulfide which may be employed in the process of this invention is a disulfide of a mercaptoheterocyclic compound containing a nitrogen-carbon double bond with which the disulfide linkage is conjugated and it may be symmetric or asymmetric. Representative examples of these disulfides include disulfides of a 5- or 6-membered mercaptoheterocyclic compound having one or more nitrogen atoms as a hetero atom and optionally having as a substituent a halogen atom, e.g., bromine, chlorine, fluorine and iodine, a lower alkoxy group, e.g., methoxy, ethoxy, propoxy and butoxy and a lower alkyl group, e.g., methyl, ethyl, propyl and butyl and condensed ring derivatives thereof: For example, 2,2'-dipyridyl disulfide, 2,2'-dipyrimidinyl disulfide, 4,4'-dipyridyl disulfide, 2,2'-diquinolyl disulfide, 2,2'-dipyrazinyl disulfide, 2,2'-diquinoxalinyl disulfide, 4,4'-diquinazolinyl disulfide, 6,6'-diacridinyl disulfide, 2,2'-diimidazolyl disulfide, 2,2'-dibenzimidazolyl disulfide, 2,2'-dibenzothiazolyl disulfide, 2,2' - dipurinyl disulfide and 2,2' - bis(1-azaazulenyl)disulfide. Substituted or unsubstituted dipyridyl disulfides are advantageous in view of commercial availability.

In the process of this invention may be satisfactorily employed any solvent that would not adversely affect the present reaction. Examples of the solvents which may be employed in the process of this invention are a wide variety of inert organic solvents, for example, ethers, e.g., dioxane and tetrahydrofuran; halogenated hydrocarbons, e.g., chloroform and methylene chloride; esters of carboxylic acids, e.g., ethyl acetate and butyl acetate; amides, e.g., dimethylformamide and dimethylacetamide; and the like. However, it is desirable in view of the type of the starting materials employed, solubility of the solvent and other factors to employ any of the above-depicted amides as a solvent in the present reaction.

The reaction of the process of this invention may be favorably effected even in the presence of a minor amount of water.

The reaction temperature in the process of this invention is not critical feature, but the reaction may be usually and preferably effected at room temperature or lower. However, an extremely elevated temperature is not advantageous because of possible occurrence of some side reactions.

The reaction period of time is not critical feature, too, and may be varied mainly depending upon the starting materials and reagents employed and the kind of the solvents employed as well as the reaction temperature applied, but the reaction is usually effected for about 2 to about 16 hours.

After completion of the reaction, the desired product may be recovered from the reaction mixture by a conventional means. For instance, after completion of the reaction, a suitable solvent in which the desired product is insoluble may be added to either the reaction mixture or the residue obtained by the removal of the solvent from the reaction mixture, thereby separating out the desired product as crystalline substances in situ and then the substances so separated may be recovered by filtration. The desired product thus recovered may be, if desired, further purified by a conventional means, e.g., recrystallization and column chromatography, but the product thus recovered is frequently of a pure form.

The following examples are given for the purpose of illustrating of this invention, but they should not be construed to be limiting the scope of this invention.

EXAMPLE 1

Benzoyl-L-lucylglycine ethyl ester (1) In 5 ml. of dimethylformamide were dissolved 467 mg. of benzoyl-L-leucine, 206 mg. of glycine ethyl ester and 485 mg. of 2,2'-dipyridyl disulfide and to the resulting solution was added 910 mg. of tris(p-chlorophenyl)phosphite. The resulting mixture was stirred at 30° C. for 15 hours. Thereafter, the solvent was distilled off from the reaction mixture and the residue was subjected to a thin layer chromatography utilizing silica gel to give 572 mg. of the desired product melting at 154° C. $[\alpha]_D = -32.3°$ (C.=3.1, ethanol)

(2) The same procedure as in the above (1) was repeated except that 683 mg. of triphenylphosphite was employed instead of the tris(p-chlorophenyl)phosphite, thereby yielding the desired product.

(3) The same procedure as in the above (1) was repeated except that 874 mg. of tris(p-methoxyphenyl)-phosphite was employed instead of the tris(p-chlorophenyl)phosphite and the reaction was effected at 15° C. for 3 hours, thereby yielding the desired product.

(4) The same procedure as in the above (1) was repeated except that 874 mg. of tris(p-methoxyphenyl) phosphite and 683 mg. of 2,2'-bis(5-nitropyridyl)disulfide were employed instead of the tris(p-chlorophenyl)phosphite and the 2,2'-dipyridyldisulfide, respectively, and the reaction was effected at 30° C. for 3 hours, thereby yielding the desired product.

(5) The same procedure as in the above (1) was repeated except that 547 mg. of 2,2'-bis(5-methylpyridyl) disulfide was employed instead of the 2,2'-dipyridyldisulfide and the reaction was effected at 30° C. for 3 hours, thereby yielding the desired product.

EXAMPLE 2

Benzyloxycarbonyl-L-asparaginyl-S-benzyl-L-cysteine methyl ester

In 5 ml. of dimethylformamide were dissolved 533 mg. of benzyloxycarbonyl-L-asparagine, 451 mg. of S-benzyl-L-cysteine methyl ester and 485 mg. of 2,2'-dipyridyldisulfide and to the resulting solution was added 910 mg. of tris(p-chlorophenyl)phosphite. The mixture was then stirred at 15° C. for 2 hours. Thereafter, 50 ml. of ether was added to the reaction mixture to separate out crystalline substances, which were then recovered by filtration to give 610 mg. of the desired product melting at 195–196° C. $[\alpha]_D = -31.7°$ (C. = 2.4, pyridine).

EXAMPLE 3

Benzyloxycarbonyl-L-asparaginylglycine ethyl ester

In 5 ml. of dimethylformamide were dissolved 533 mg. of benzyloxycarbonyl-L-asparagine, 206 mg. of glycine ethyl ester and 485 mg. of 2,2'-dipyridyldisulfide and to the resulting solution was added 910 mg. of tris(p-chlorophenyl)phosphite. The mixture was stirred at 40° C. for 2 hours. Thereafter, 50 ml. of ether was added to the reaction mixture to separate out crystalline substances, which were then recovered by filtration to give 680 mg. of the desired product melting at 184–185° C. $[\alpha]_D = -5.5°$ (C.=1, dimethylformamide).

EXAMPLE 4

Benzyloxycarbonyl-L-valylglycine ethyl ester

In 5 ml. of dimethylformamide were dissolved 503 mg. of benzyloxycarbonyl-L-valine, 206 mg. of glycine ethyl ester and 485 mg. of 2,2'-dipyridyldisulfide and to the resulting solution was added 910 mg. of tris(p-chlorophenyl)phosphite. The mixture was then stirred at 40° C. for 5 hours. The solvent was distilled off from the reaction mixture under reduced pressure and to the residue was added benzene to separate out crystalline substances, which were then recovered by filtration to give 637 mg. of the desired product melting at 166° C. $[\alpha]_D = -31.8°$ (C.=1.0, methanol).

EXAMPLE 5

Benzyloxycarbonyl-L-seryl-L-tyrosine methyl ester

In 5 ml. of dimethylformamide were dissolved 478 mg. of benzyloxycarbonyl-L-serine, 390 mg. of L-tyrosine methyl ester, 485 mg. of 2,2'-dipyridyldisulfide and 681 mg. of triphenylphosphite and the resulting mixture was stirred at 20° C. for 12 hours. The solvent was distilled off from the reaction mixture under reduced pressure and the residue was subjected to a column chromatography utilizing silica gel to give 531 mg. of the desired product melting at 115–116° C. $[\alpha]_D^{21} = +13.5°$ (C.=2, dimethylformamide).

EXAMPLE 6

N - benzyloxycarbonyl - S-benzyl-L-cysteinyl-L-tyrosyl-L-isoleucyl-L-glutaminyl-L-asparagine tert. butyl ester In 5 ml. of dimethylformamide were dissolved 501 mg. of N-benzyloxycarbonyl-S-benzyl-L-cysteinyl-L - tyrosine, 429 mg. of L-isoleucyl-L-glutaminyl-L-asparagine tert. butyl ester, 242 mg. of 2,2'-dipyridyldisulfide and 455 mg. of tris(p-chlorophenyl)phosphite and the resulting mixture was then stirred at 15° C. for 12 hours. The solvent was distilled off from the reaction mixture under reduced pressure and to the residue was added a mixture of methylene chloride with ether to give crystalline substances. The substances were then recovered by filtration and washed successively with the above mixture, 0.2 N hydrochloric acid, water, a 5% aqueous solution of sodium bicarbonate and then water followed by air-drying. There was obtained 732 mg. of the desired product melting at 230° C. $[\alpha]_D = -20.0°$ (C.=0.5, dimethylformamide).

What is claimed is:

1. A process for the preparation of a peptide which comprises reacting an amino acid or peptide wherein other reactive functional groups than carboxyl group are protected with protective groups with an amino acid or peptide wherein other reactive functional groups than amino group are protected with protective groups in the presence of a triaryl phosphite and a disulfide of a mercaptoheterocyclic compound containing a nitrogen-carbon double bond with which the disulfide linkage is conjugated.

2. The process according to claim 1 wherein said triaryl phosphite is selected from the group consisting of triphenyl phosphite, tris(chlorophenyl)phosphites, tris(methoxyphenyl)phosphites and tritolylphosphites.

3. The process according to claim 1 wherein said triaryl phosphite is selected from the group consisting of triphenyl phosphite, tris(p-chlorophenyl)phosphite and tris-(p-methoxyphenyl)phosphite.

4. The process according to claim 1 wherein said disulfide is selected from the group consisting of substituted or unsubstituted dipyridyl disulfides.

5. The process according to claim 1 wherein said disulfide is selected from the group consisting of 2,2'-dipyridyl disulfide, 2,2'-bis(5-nitropyridyl)disulfide and 2,2'-bis(5-methylpyridyl)disulfide.

References Cited

Mukaiyama et al.: Tet. Let., 1970, 1901.

LEWIS GOTTS, Primary Examiner

R. J. SUYAT, Assistant Examiner